(No Model.)
D. W. KARSHNER.
SAW JOINTER.
No. 440,163. Patented Nov. 11, 1890.
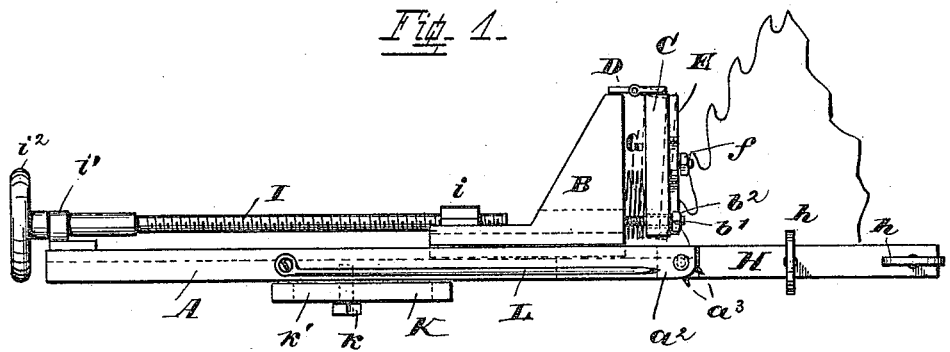
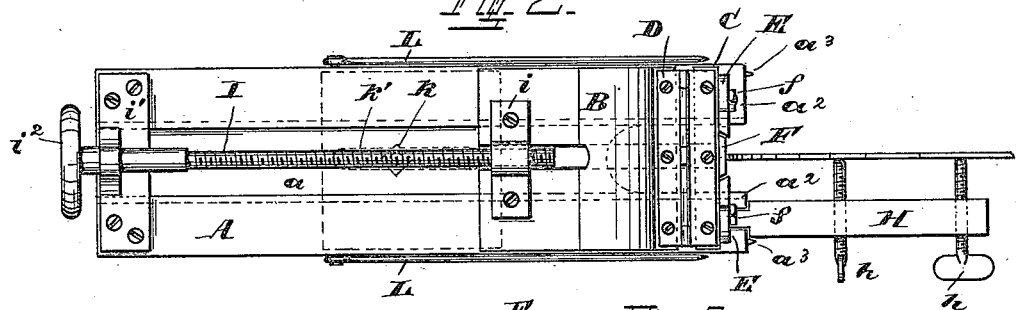
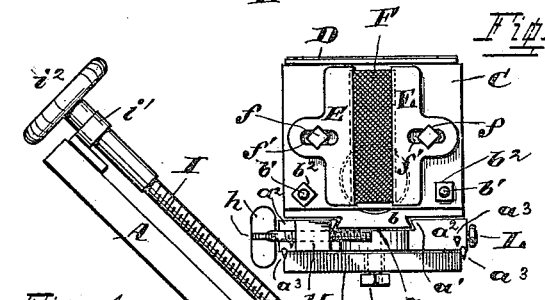
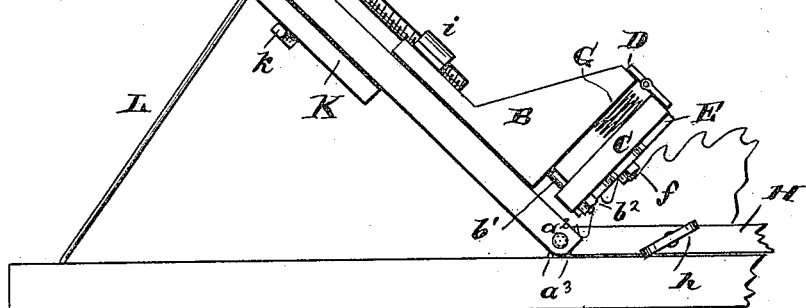
Attest
August F. Herbold.
James W. Ramsey
Inventor
Daniel W. Karshner,
By Parkinson & Parkinson,
his attorneys.

UNITED STATES PATENT OFFICE.

DANIEL W. KARSHNER, OF TIFFIN, OHIO.

SAW-JOINTER.

SPECIFICATION forming part of Letters Patent No. 440,163, dated November 11, 1890.

Application filed June 20, 1890. Serial No. 356,093. (No model.)

*To all whom it may concern:*

Be it known that I, DANIEL W. KARSHNER, a citizen of the United States, residing at Tiffin, in the county of Seneca and State of Ohio, have invented a certain new and useful Improvement in Saw Jointers and Sharpeners, of which the following is a specification.

My jointer is especially adapted to joint circular saws, and performs its work while the saw is in position in the saw mill or bench, and it is provided with mechanism whereby it is adapted to joint small saws protruding from tables having an extended surface. It is also a convenient and efficient means for sharpening saws.

Saw-jointers as heretofore made have presented an unyielding filing-surface to the tooth of the saw, and when brought in too close proximity to the saw-tooth injury results either to the tooth or to the grinding-plate.

The object of my invention is to provide a saw-jointer in which the grinding-plate will yield to abnormal pressure, thus preserving the grinding-plate and saw from injury and insuring a perfect and uniform jointing of the saw; also, to provide a jointer adapted to present its grinding-face to the saw at any desired inclination, and, also, to provide for sharpening the saw by means of the jointer; and the invention consists in the construction and arrangement of parts, hereinafter more fully set forth.

In the drawings, Figure 1 is a side view of my improved jointer. Fig. 2 is a top view of the same; Fig. 3, an end view, and Fig. 4 a side view showing my improved saw-jointer applied to a small circular saw.

A is a bed-plate provided with a longitudinal groove $a$, having receding sides $a'$.

B is a block, having at its bottom a dove-tailed projection $b$, adapted to slide in the groove $a$.

C is a block or frame, preferably connected at its top to block B by means of a hinge D and provided with clamps E, adapted to receive and hold a file or other grinding-plate F. Bolts $b'$ take loosely through apertures in the lower part of frame C and into block B and have nuts $b^2$ taking over their ends. A spring G, preferably adjustable, is placed between the block B and frame C. Its adjustment may be conveniently effected by placing the spring nearer to or farther from the pivotal point connecting the block and frame. The nearer the spring is placed to the pivotal point the less resistance it will exert to the inward movement of the frame. The clamps E are fastened to frame C by means of bolts $f$, taking through slots $f'$, and are adapted to receive files of various widths. The end of the bed-plate adjacent to the file is recessed, forming extensions $a^2$, between which the saw takes when being jointed. These extensions are provided at their ends with barbs $a^3$, which take into the saw-bench when jointing a saw and prevent the jointer from shifting its position while in use. One of the extensions $a^2$ has a guide-bar H hinged thereto, provided with thumb-screws $h$, adapted to take against the saw-blade. This guide-bar enables the operator to place the file at the desired angle to the vertical plane of the saw.

I is a screw turning in a nut $i$, attached to block B. One end of this screw passes through a bearing $i'$ upon a bed-plate A, and has keyed thereto a hand-wheel $i^2$. Turning this hand-wheel to the left or right forces the block B and its attendant mechanism forward or back, and causes the file to either approach or recede from the saw to be jointed.

To the bottom of the bed-plate a guide K is secured by means of a bolt $k$ taking through slot $k'$. When the jointer is used in a horizontal position, this guide is adjusted to abut against a stationary part of the saw-mill—*e. g.*, the saw guide. The jointer is then clamped to the saw-mill by means of a suitable clamp. The hand-wheel is turned until the file comes in contact with the longest tooth on the saw, the saw revolving meanwhile. As the teeth are ground the file is forced further toward the axis of the saw. Should the file be forced forward too rapidly, or one or more of the teeth extend radially beyond those to which the file is adjusted, the file will yield to the abnormal strain against the resistance of the spring, and thus prevent injury to the saw or file. If it is desired to present the file to the saw at an inclination, as indicated in dotted lines in Fig 1, the nuts $b^2$ on the bolts $b'$ are screwed inward, forcing the lower end of the file-holding frame inward and giving the file the desired inclination. When jointing a saw protruding from a table having an extended surface, the jointer is thrown into an inclined position and supported by standards or legs L, pivotally attached to either side of the bed-plate.

By means of this jointer I am also enabled to put a better cutting-edge on the teeth than is obtained when they are filed in the ordinary way. It not only affords a more convenient means of sharpening the teeth, but gives an edge which cuts easier and lasts longer.

I claim—

1. The combination, in a saw-jointer, of a block and a grinding-plate pivotally and yieldingly attached thereto, substantially as and for the purpose specified.

2. The combination, in a saw-jointer, of a block, a grinding-plate pivotally attached thereto, a screw or equivalent means whereby the inclination of the grinding-plate may be adjusted, and an outwardly-pressing spring, substantially as and for the purpose specified.

3. The combination, in a saw-jointer, of a block, a grinding-plate pivotally attached thereto, a screw or equivalent means whereby the inclination of the grinding-plate may be adjusted, and a spring adjustably interposed between the block and grinding-plate, substantially as and for the purpose specified.

4. The combination, in a saw-jointer, of a bed-plate A, a block B, a screw I, adapted to vary the position of the block on the bed-plate, a file-holding frame C, attached to the block, and an outwardly-pressing spring G, substantially as and for the purpose specified.

5. The combination, in a saw-jointer, of a bed-plate, a longitudinal groove therein, a block provided with a projection taking into the groove and adapted to slide on the bed-plate, a file-holding frame connected with the block, and an adjustable spring, substantially as and for the purpose specified.

6. The combination, in a saw-jointer, of a bed-plate, a block sliding thereon, a frame attached to the block, a file secured to the frame, an outwardly-pressing spring interposed between the block and frame, and a screw or equivalent means for varying the inclination of the file, substantially as and for the purpose specified.

7. The combination, in a saw-jointer, of a bed-plate, a block adapted to slide thereon, a file-holding frame pivotally attached to the block, bolts taking into the block and passing beyond the frame, nuts taking over the bolts and adapted to adjust the file to the desired inclination, and means for permitting the file to yield to abnormal strains, substantially as and for the purpose specified.

8. The combination, in a saw-jointer, of the bed-plate A, provided with a longitudinal groove $a$, having receding sides $a'$, the block B, provided with a dovetailed projection $b$, the file-holding frame C, the hinge D, the spring G, the bolts $b'$, and nuts $b^2$, substantially as and for the purpose specified.

9. The combination, in a saw-jointer, of the bed-plate A, extensions $a^2$, barbs $a^3$, projecting from said extensions and adapted to hold the jointer in a fixed position, and standards L, adapted to support the bed-plate at the desired angle, substantially as and for the purpose specified.

10. The combination, in a saw-jointer, of a bed-plate, standards supporting the same, a file-holding frame, one or more screws for adjusting the inclination thereof, a grinding-plate, and an outwardly-pressing spring adapted to permit the grinding-plate to yield to abnormal pressure throughout its length, substantially as and for the purpose specified.

DANIEL W. KARSHNER.

Witnesses.
ROBERT LYSLE,
FRANK MIZEN.